United States Patent [19]

Iwatsuki

[11] Patent Number: 4,751,858
[45] Date of Patent: Jun. 21, 1988

[54] DEVICE FOR CONTROLLING QUANTITY OF LUBRICATING OIL IN AUTOMATIC TRANSMISSION FOR VEHICLE

[75] Inventor: Kunihiro Iwatsuki, Toyota, Japan

[73] Assignee: Toyota Jidosha Kabushiki Kaisha, Aichi, Japan

[21] Appl. No.: 941,031

[22] Filed: Dec. 12, 1986

[30] Foreign Application Priority Data

Dec. 12, 1985 [JP] Japan ................ 60-279944

[51] Int. Cl.⁴ .......................................... B60K 41/10
[52] U.S. Cl. ....................................... 74/867; 74/467
[58] Field of Search .................. 74/867, 868, 869, 467

[56] References Cited

U.S. PATENT DOCUMENTS

| | | | |
|---|---|---|---|
| 3,738,452 | 6/1973 | Hausinger | 74/467 X |
| 3,995,727 | 12/1976 | Ivey | 74/467 X |
| 4,106,369 | 8/1978 | Taga | 74/868 X |
| 4,368,802 | 1/1983 | Grabill et al. | 74/467 X |
| 4,394,827 | 7/1983 | Kubo et al. | 74/867 X |
| 4,425,817 | 1/1984 | Wells et al. | 74/467 |

FOREIGN PATENT DOCUMENTS

| | | | |
|---|---|---|---|
| 24279 | 2/1980 | Japan | 74/467 |
| 56-24246 | 3/1981 | Japan . | |
| 58-38186 | 8/1983 | Japan . | |
| 40062 | 3/1984 | Japan | 74/467 |
| 59-86749 | 5/1984 | Japan . | |
| 2129507 | 5/1984 | United Kingdom | 74/467 |

Primary Examiner—Leslie A. Braun
Assistant Examiner—Dwight G. Diehl
Attorney, Agent, or Firm—Parkhurst & Oliff

[57] ABSTRACT

In a device for controlling a quantity of lubricating oil in an automatic transmission for a vehicle, wherein a pump is rotated to circulate the lubricating oil, a circulation quantity of lubricating oil is increased, decreased or changed in accordance with the speed of the vehicle. As a result, the circulation quantity of lubricating oil in the automatic transmission is constantly regulated to ensure the necessary and sufficient quantities, even when there is a throttle opening of zero, and more particularly, even during high speed coasting.

12 Claims, 8 Drawing Sheets

FIG.3

| SHIFT POSITION | | C1 | C2 | C0 | B1 | B2 | B3 | B0 | F1 | F2 | F0 |
|---|---|---|---|---|---|---|---|---|---|---|---|
| P | | | | ○ | | | | | | | |
| R | | | ○ | ○ | | | ○ | | | | |
| N | | | | ○ | | | | | | | |
| D | 1 | ○ | | ○ | | | | | | ◎ | ◎ |
| D | 2 | ○ | | ○ | | ○ | | | ◎ | | ◎ |
| D | 3 | ○ | ○ | ○ | | ○ | | | | | ◎ |
| D | 4 | ○ | ○ | | | ○ | | ○ | | | |
| 2 | 1 | ○ | | ○ | | | | | | ◎ | ◎ |
| 2 | 2 | ○ | | ○ | ○ | ○ | | | ◎ | | ◎ |
| 2 | 3 | ○ | ○ | ○ | | ○ | | | | | ◎ |
| L | 1 | ○ | | ○ | | | ○ | | | ◎ | ◎ |
| L | 2 | ○ | | ○ | ○ | ○ | | | ◎ | | ◎ |

S=0 lb=0.705(O/D), Ne≥1500rpm    No

| Acc | ~4000rpm | 4000~5000rpm | 5000~6000rpm | 6000~7000rpm | 7000rpm~ |
|---|---|---|---|---|---|
| Acc(0) | Aso(0) | Aso(1) | Aso(2) | Aso(3) | Aso(4) |
| Acc(1) | Aso(1) | Aso(1) | Aso(2) | Aso(3) | Aso(4) |
| Acc(2) | Aso(2) | Aso(2) | Aso(2) | Aso(3) | Aso(4) |
| Acc(3) | Aso(4) | Aso(4) | Aso(4) | Aso(4) | Aso(4) |
| Acc(4) | Aso(5) | Aso(5) | Aso(5) | Aso(5) | Aso(5) |
| Acc(5) | Aso(5) | Aso(5) | Aso(5) | Aso(6) | Aso(6) |
| Acc(6) | Aso(5) | Aso(5) | Aso(5) | Aso(6) | Aso(6) |
| Acc(7) | Aso(5) | Aso(5) | Aso(6) | Aso(6) | Aso(6) |

DEVICE FOR CONTROLLING QUANTITY OF LUBRICATING OIL IN AUTOMATIC TRANSMISSION FOR VEHICLE

BACKGROUND OF THE INVENTION

This invention relates to improvements in a device for controlling a quantity of lubricating oil in an automatic transmission for a vehicle, wherein a pump is rotated to circulate the lubricating oil.

The circulation quantity of lubricating oil (herein, the circulation quantity has the same meaning as the lubricating oil quantity or the lubricating oil pressure, etc.) in an automatic transmission has heretofore been mechanically determined by the rotary speed of a pump and the engine load (based upon, e.g., a throttle opening). The rotary speed of the pump directly corresponds to the engine rotary speed at a ratio of 1:1. When the pump rotary speed increases to a predetermined value or more, the circulation quantity is determined in association with the engine load represented by the throttle opening or the like. When the pump rotary speed is low, the circulation quantity is determined by a discharge value of the pump.

However, the circulation quantity of lubricating oil is not necessarily optimally defined by these factors. For example, during coasting at high speed, the engine load is negative (throttle opening is zero), however, the automatic transmission members rotate at high speed due to the reverse driving torque. Consequently, a considerable quantity of the lubricating oil is needed.

To obviate the above-described disadvantage, for example, Japanese Patent Kokai (Laid-Open) No. 86749/1984 discloses a device for supplying lubricating oil. Even when the throttle opening is low, and hence the line pressure is lower than a predetermined regulated pressure value of a torque converter oil pressure control valve (a secondary regulator valve), a sufficient quantity of oil can be supplied to lubrication section without lowering the torque converter oil pressure. However, such lubrication supply devices are designed to obviate the disadvantageous relationship between the torque converter and throttle opening at times of low throttle openings. Such devices, however, do not optimize the lubricating oil quantities at all times.

Namely, the prior art (including Patent Kokai (Laid-Open) No. 86749/1984), has a constant quantity of lubricating oil when the throttle opening zero, so that, the quantity of lubricating oil is not increased or decreased as occasion demands at the time of a zero throttle opening. As a consequence, the quantity of lubricating oil becomes insufficient when coasting at high speed for a long period of time, and the like.

SUMMARY OF THE INVENTION

The present invention obviates the above-described disadvantages of the prior art and has as its object the provision of a device for controlling a quantity of lubricating oil in an automatic transmission for a vehicle, wherein, even when a throttle opening (engine load) or a pump rotary speed (engine rotary speed) is low, for example, if a large quantity of lubricating oil is needed (as in the case of high speed coasting), then the need can be precisely satisfied.

To achieve the above-described object, as the technical illustration thereof is shown in FIG. 1, the present invention contemplates a device for controlling the quantity of lubricating oil in an automatic transmission for a vehicle, wherein a pump is rotated to circulate the lubricating oil, having sensors for detecting vehicle speed; and a control system for setting the circulation quantity of lubricating oil in accordance with at least the vehicle speed.

According to the present invention, the circulation quantity of lubricating oil is increased or decreased in accordance with at least the high or low speed of a vehicle, so that, even when the throttle opening (engine load) is fully closed for example, lubricating oil of a desired quantity is properly supplied.

In the preferred embodiment, there is provided means for increasing, decreasing or changing the circulation quantity of lubricating oil in accordance with one of the engine load, the occurrence of shifting, the type of shifting, the pattern of shifting and the gear stage, as well as speed of the vehicle. With this arrangement, the circulation quantity of lubricating oil is properly regulated, so that the circulation quantity of lubricating oil is suited to the particular running conditions.

Additionally, the control system of the preferred embodiment provides for increasing, decreasing or changing the circulation quantity of lubricating oil in accordance with at least the type of shifting and the engine load, in addition to the high or low speed of the vehicle, for a predetermined period of time after shifting has occurred. Accordingly, even when abrupt heating occurs at the frictionally engaging devices due to shifting, rapid cooling is achieved.

Furthermore, in the preferred embodiment, the aforesaid predetermined period of time is changed in accordance with at least the type of shifting and the engine load. With this arrangement, the circulation quantity of lubricating oil for the cooling during shifting can be increased only for a necessary and sufficient period of time, so that the proper function of lubrication and the decrease in power loss can be optimally balanced.

There has heretofore been a technique wherein the line pressure is cut back in accordance with the type of gear stages (the types of gear stages qualitatively include a factor of vehicle speed). Generally, when the engine load is high, the line pressure is raised. However, in such devices, the line pressure is not excessively increased to a predetermined value or more so as to avoid an increased shift shock. As a result, the quantity of lubricating oil is limited along with this limited line pressure. However, this technique is quite different in object, arrangement and effect from the technique of the present invention, wherein the quantity of lubricating oil itself is actively changed in accordance with the increase or decrease in the vehicle speed.

BRIEF DESCRIPTION OF THE DRAWINGS

The above object, features and advantages of the present invention, as well as other objects and advantages thereof, will become more apparent from the description of the invention which follows, taken in conjunction with the accompanying drawings, wherein like reference characters designate the same or similar parts and wherein:

FIG. 3 is a chart showing the operating conditions of the frictionally engaging devices in the above automatic transmission;

DESCRIPTION OF THE PREFERRED EMBODIMENTS

Figure 1:
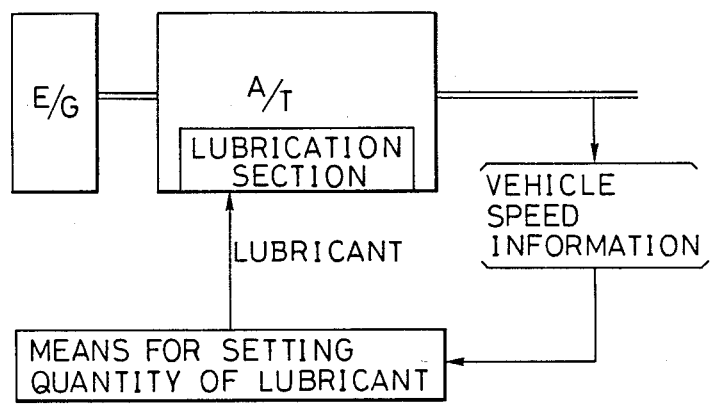
FIG. 1 is a block diagram showing the technical illustration of the present invention.

The present invention, which can be illustrated by Fig. 1, will be described in detail with reference to the accompanying drawings which illustrate preferred embodiments of the present invention.

Figure 2:
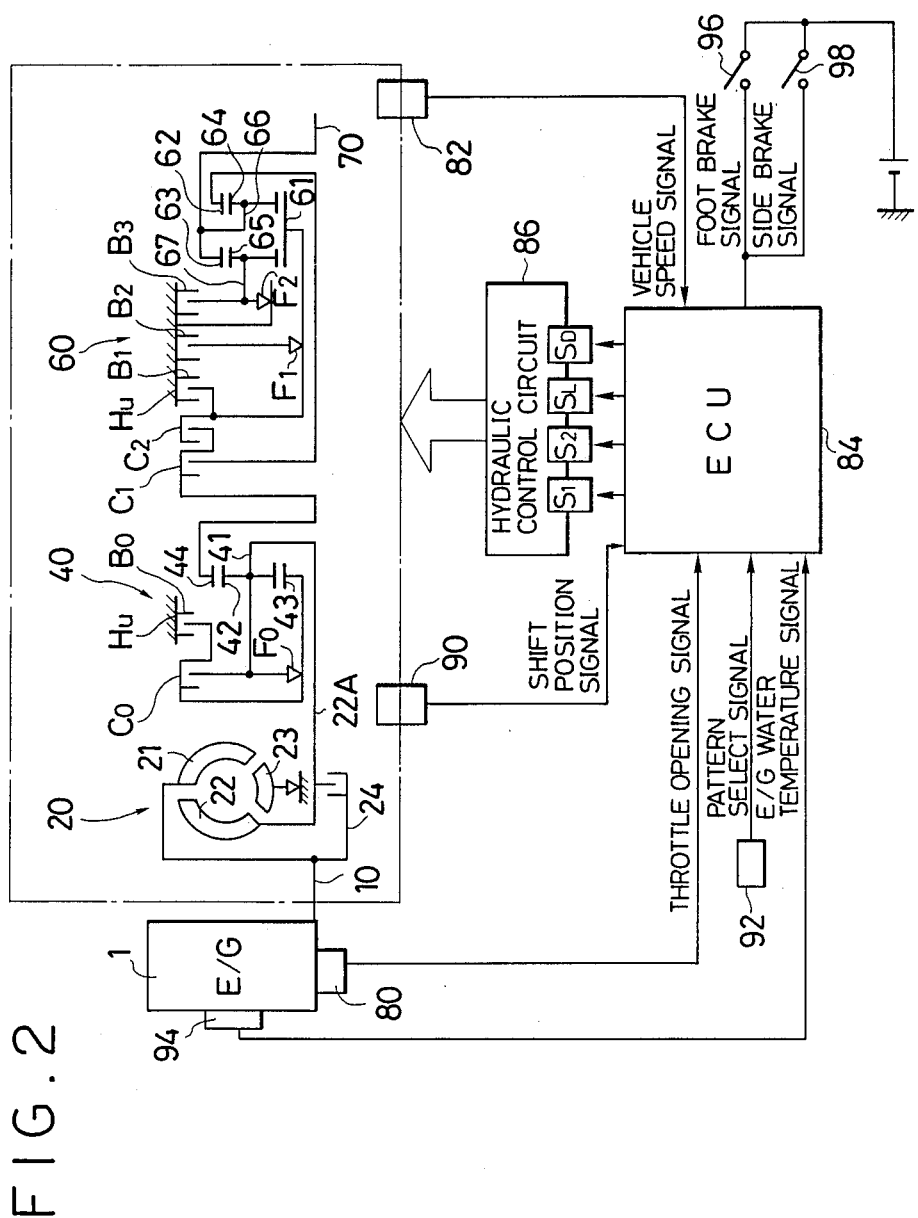
FIG. 2 is a skeleton diagram showing the general arrangement of the automatic transmission for a vehicle, to which is applied one embodiment of the hydraulic control device of the automatic transmission according to the present invention.

FIG. 2 shows the outline of the general arrangement of the automatic transmission for a vehicle to which this embodiment is applied.

The automatic transmission includes a torque converter 20, an overdrive mechanism 40 and an underdrive mechanism 60, including three forward gear stages and one reverse gear stage.

The torque converter 20 is of a type well known in the art, and includes a pump 21, a turbine 22, a stator 23 and a lockup clutch 24. The pump 21 is connected to a crankshaft 10 of an engine 1. The turbine 22 is connected to a carrier 41 of planetary gear trains in the overdrive mechanism 40 through a turbine shaft 22A.

In the overdrive mechanism 40, a planetary pinion 42 rotatably supported by carrier 41 is in meshing engagement with a sun gear 43 and a ring gear 44. A clutch CO and a one-way clutch FO are provided between the sun gear 43 and the carrier 41. A brake BO is interposed between the sun gear 43 and a housing Hu.

The underdrive mechanism 60 is provided with front and rear planetary gear trains. The two planetary gear trains include a common sun gear 61, ring gears 62 and 63, planetary pinions 64 and 65, and carriers 66 and 67.

The ring gear 44 in the overdrive mechanism 40 is connected to the ring gear 62 through a clutch C1. A clutch C2 is interposed between the ring gear 44 and the sun gear 61. The carrier 66 is connected to the ring gear 63. The carrier 66 and the ring gear 63 are connected to an output shaft 70.

A brake B3 and a one-way clutch F2 are interposed between the carrier 67 and the housing Hu. A brake B2 and a one-way clutch F1 are provided between the sun gear 61 the housing Hu. A brake B1 is interposed between the sun gear 61 and the housing Hu.

The automatic transmission of this embodiment is provided with a computer (ECU) 84 receiving input signals from a throttle sensor 80 for detecting a throttle opening reflecting a load of the engine 1, and from a vehicle speed sensor 82 for detecting a vehicle speed and the like. Computer 84 controls solenoid valves S1 and S2 (for controlling shift valves), solenoid valve SL (for controlling the lockup clutch) and an electromagnetic proportion valve SD (for controlling the line pressure and lubricating oil pressure) in a hydraulic control device 86 in accordance with a preset shift map. As a result, combinations of engagements between the clutches, the brakes and the like as shown in FIG. 3 are performed to thereby carry out shift controls. In FIG. 3, marks ○ indicate engaged conditions and marks ⊙ indicate engaged conditions only at the time of driving.

Additionally, in FIG. 2, designated at 90 is a shift position sensor to detect the selected shift position (e.g., N, D, R and the like), 92 is a pattern select switch to select E (economical running), P (power running) or the like, 94 is an engine water temperature sensor to detect the water temperature of the engine, 96 is a foot brake switch to detect foot brake actuation, and 98 is a side brake switch to detect side brake actuation, respectively.

Figure 4:
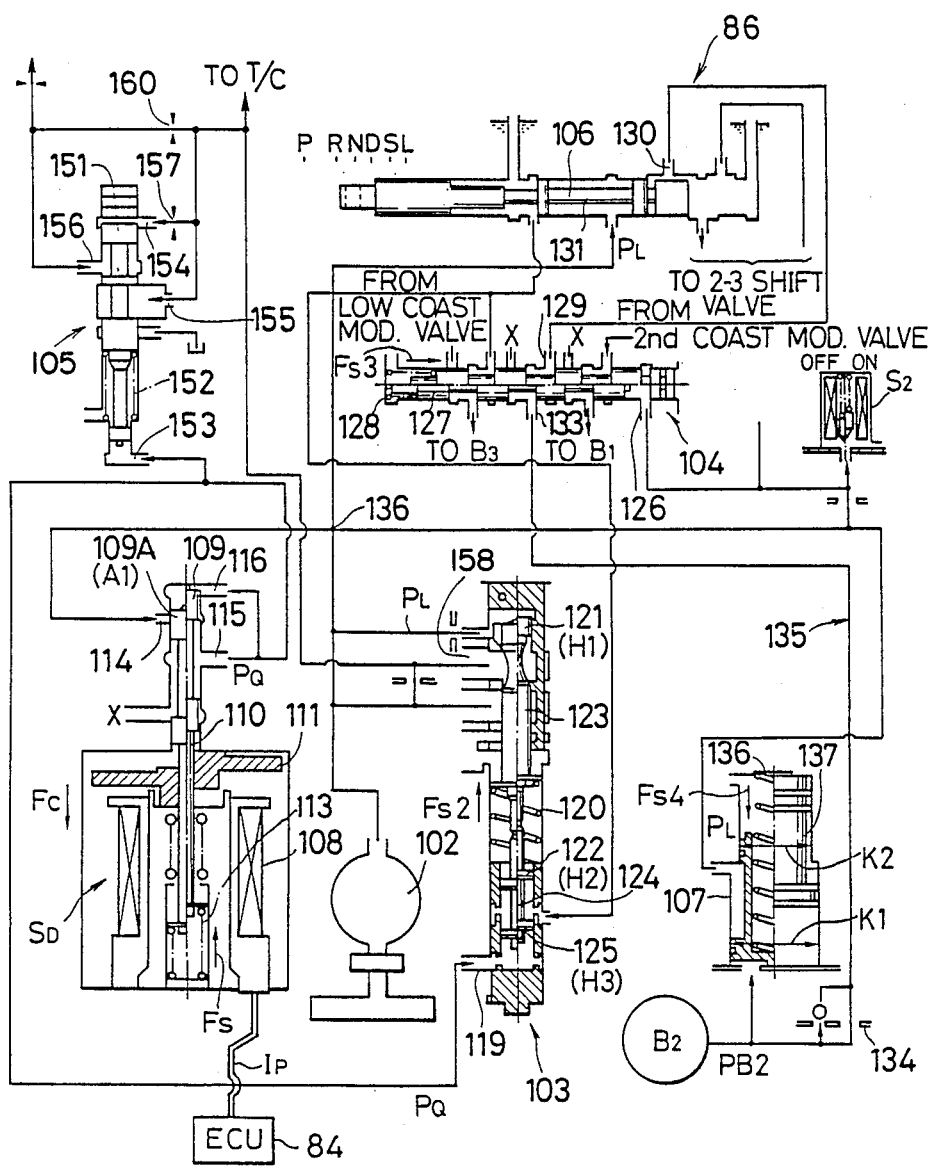
FIG. 4 is hydraulic circuit diagram showing the essential portions of the hydraulic control device.

FIG. 4 shows the essential portions of the hydraulic control device 86.

In the drawing, denoted at SD is the electromagnetic proportion valve, at 102 is a pump directly connected to the engine, at 103 is the primary regulator valve for regulating the line pressure, at 104 is a 1-2 shift valve for changing over between a first gear stage and second gear stage, at S2 is the solenoid valve for controlling the 1-2 shift valve, at 105 is a secondary regulator valve for supplying the lubricating oil, at 106 is a manual valve operated by the driver and at 107 is an accumulator for controlling the transition characteristics when oil pressure is supplied to or removed from the brake B2, respectively.

The electromagnetic proportion valve SD is well known by itself and includes spools 109 and 110, coil 108, spring 113, plunger 111 and the like. The spool 110 and the plunger 111 are interconnected in the axial direction. The coil 108 applies a force Fc directed downwardly in the drawing to the plunger 111 (and the spool 110) in accordance with load current Ip from the ECU 84. In opposition to the force Fc, the spring 113 renders a force Fs to the spool 110. A discharge pressure from the pump 102 acts on a port 114. The oil pressure at ports 115 and 116 is designated PQ. PQ is derived through the following equation (1), wherein A1 is the surface area of land 109a of spool 109:

$$PQ = (Fs - Fc)/Al \qquad (1)$$

As a consequence, the force Fc directed downwardly in the drawing, which is generated by the coil 108, is controlled, so that the oil pressure PQ generated at the port 115 in accordance with equation (1) can be controlled to a desired value ranging from zero to Fs/A1. Oil pressure PQ corresponds to a so-called throttle pressure which has heretofore been normally generated by a throttle valve, wherein a spool is mechanically drivable through a cam in proportion to a throttle opening. Oil pressure PQ acts on a port 119 of a primary regulator valve 103 to control the line pressure. Oil pressure PQ also acts on a port 153 of a secondary regulator valve 105 to control the lubricating oil pressure.

In the primary regulator valve 103, the line pressure PL is generated in relation to the valve of the control pressure PQ, as in conventional. Because the load current Ip to the coil 108 is controlled in response to a command from the ECU 84, the line pressure PL can be desirably controlled. The equation relating to the pressure regulation in the primary regulator valve 103 is as follows:

$$PL = \{Fs2 + (H2 - H3)PR + H3 \cdot PQ\}/H1 \qquad (2);$$

herein Fs2 is the acting force of a spring 120, H1–H3 are face areas of lands 121, 122 and 125 of spools 123 and 124, and PR is the line pressure applied to the lands 122 and 125 when the manual valve 106 is in the reverse range.

The frictionally engaging devices are described below. The brake B2 will be described as typifying the frictionally engaging devices.

A signal pressure of the solenoid valve S2 acts on port 126 of the 1–2 shift valve 104. As a consequence, a spool 127 of the 1–2 shift valve 104 slides to the right and left in the drawing in accordance with the ON-OFF operation of the solenoid valve S2. Spool 127 is biased to the right due to the force Fs3 from a spring 128. When spool 121 is in the its rightward position, ports 133 and 129 in the 1–2 shift valve 104 communicate with one another. The line pressure PL from a port 130 of the manual valve 106 acts on the port 129 in the D (drive) range. More specifically, the ports 130, 129 and 133 are adapted to be connected to one another in the D range selection position of the spool 131 of the manual valve 106. The port 133 is connected to the brake B2 through an oil line 135 and a check valve 134. As a consequence, in the D range, the line pressure PL is supplied to or removed from the brake B2 in accordance with the ON-OFF operation of the solenoid valve S2.

The oil line 135 is connected with accumulator 107, whereby the transitional oil pressure level is controlled when the line pressure PL is supplied to or removed from the brake B2. The transitional oil pressure PB2, i.e., the oil pressure while the accumulator 107 is working, is derivable as a function of the line pressure PL applied as the back pressure as indicated by the following equation.

$$PB2 = Fs4 + (K1 - K2)PL/K1 \qquad (3);$$

wherein Fs4 is an acting force of a spring 136, and K1 and K2 are face areas of two lands of an accumulator piston 137.

Because the control oil pressure PQ is controlled by the load current control to the electromagnetic proportion valve SD through the above-described equations (1)–(3), the oil pressure PB2 to the brake B2 can be desirably controlled at transitional times, as well as other times.

A lubrication system will hereinafter be described.

The secondary regulator valve 105 includes a spool 151 and a spring 152. The above-described control oil pressure PQ acts on a part 153 of secondary regulator valve 150. A port 154 is connected to a drain port 158 of the primary regulator valve 103 through an orifice 157, whereby oil pressure from the drain port 158 (torque converter feed pressure Ptc) acts thereon. In this secondary regulator valve 105, a port 155 is short-circuited to a port 156 in the following balance in accordance with the oil pressure Ptc from the port 154 and the oil pressure PQ from the port 153.

$$D1 \cdot Ptc = Fs5 + D2 \cdot PQ$$

$$Ptc = Fs5/D1 + D2 \cdot PQ/D1 \qquad (4)$$

wherein D1 is a face area of the spool 151 on the side of the port 154, D2 a face area of the spool 151 on the side of the port 153, and Fs5 is a load of the spring 152.

Figure 5:
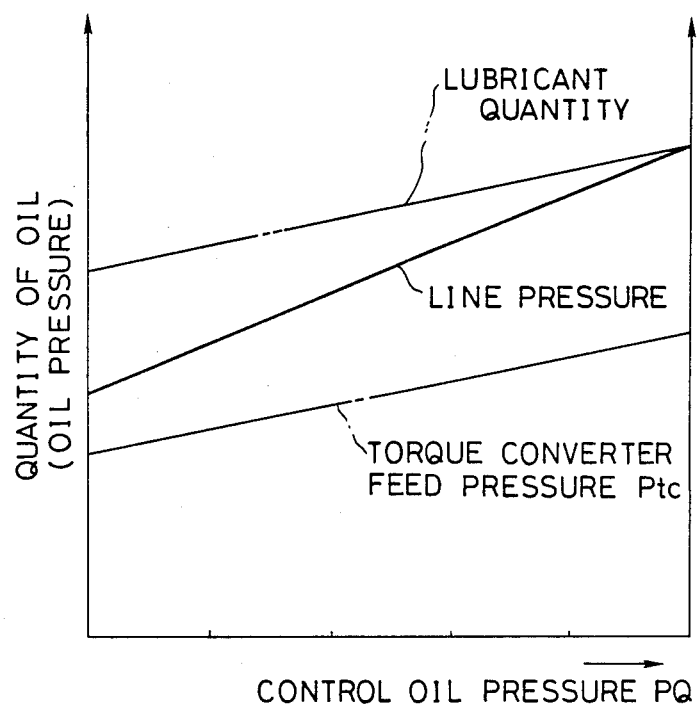
FIG. 5 is a chart showing the relationship between control oil pressure PQ and the quantity of lubricating oil.

As a result of this balance equation (4), the lubricating oil is supplied from the port 156 and an orifice 160, such that the quantity of lubricating oil increases with increasing control oil pressure PQ. FIG. 5 shows this relationship.

Figure 6:
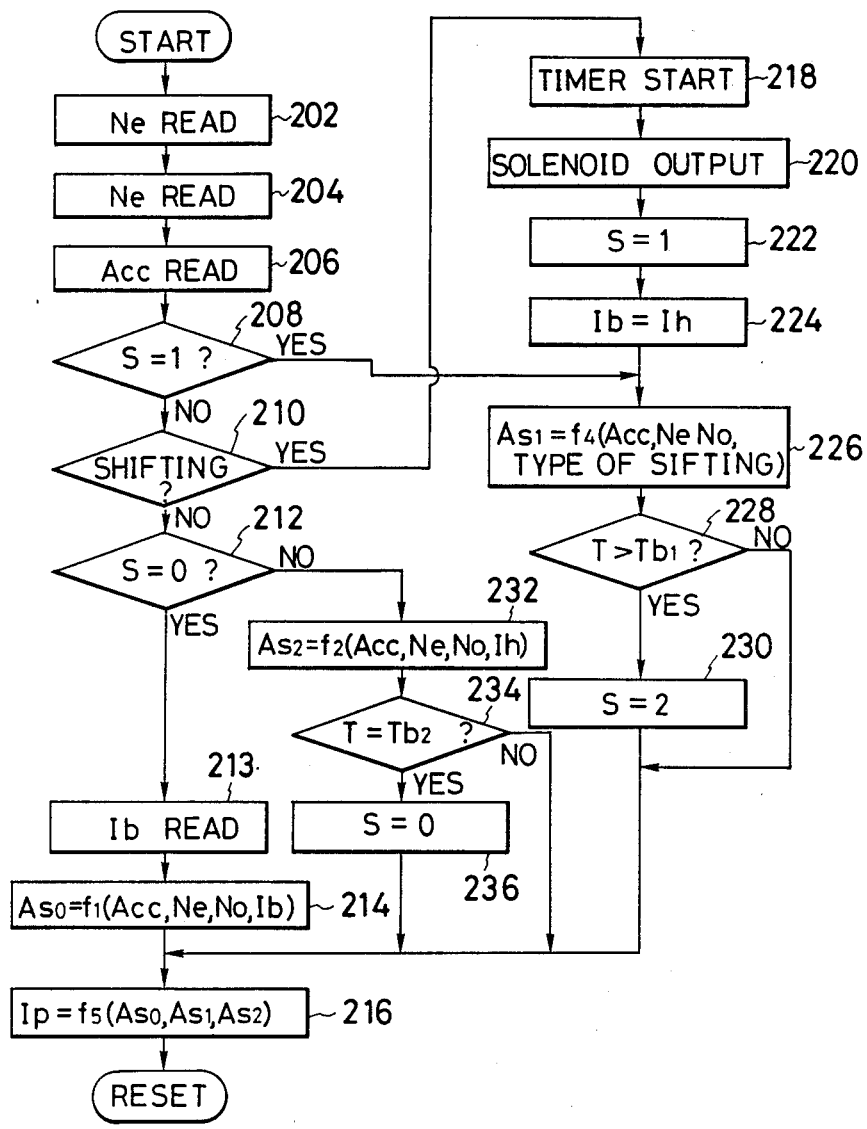
FIG. 6 is a flow chart showing a control routine.

FIG. 6 shows the control flow chart for the above embodiment.

In Step 202–206, an engine rotary speed Ne, rotary speed of an output shaft 70 of the automatic transmission (corresponding to the vehicle speed) No, and the accelerator opening Acc are read in, respectively. Denoted as S in Step 208 is a flag, wherein S=1 during the process of shifting, and S=2 when there is an increase in the quantity of lubricating oil for a period of time after the shifting, and S=0 at all other times, respectively.

Figures 7, 8:
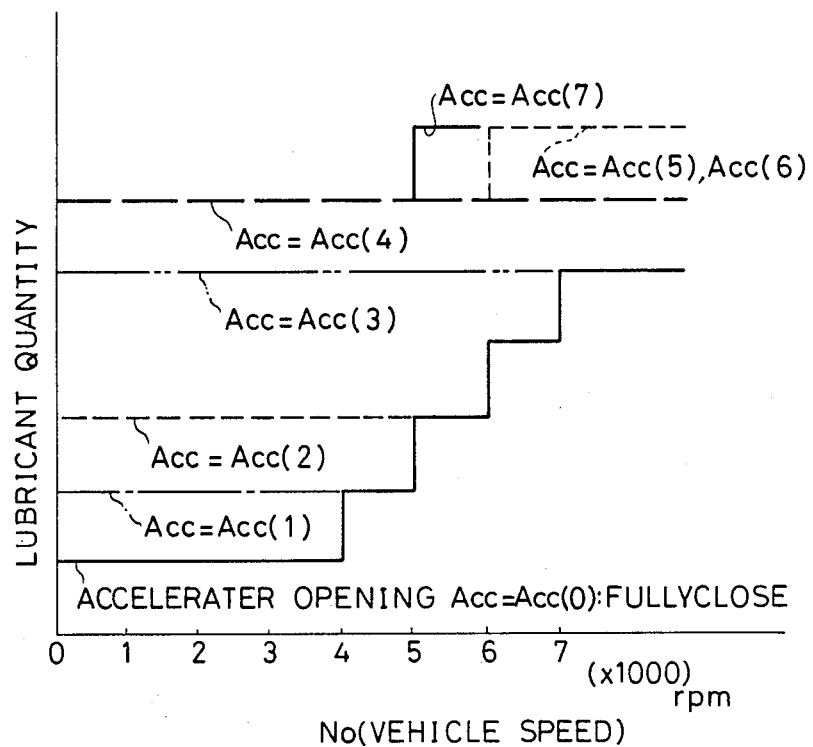
FIG. 7 is a chart showing an example of a map when an accelerator opening Acc is corrected in accordance with engine speed vehicle speed and type of shifting.
FIG. 8 is a chart showing the above map in the relationship between the vehicle speed and the quantity of lubricating oil.

When S=0, the routine proceeds from Step 208 to Steps 210, 212, 213, 214 and 216, and the reset is performed. In Step 214, a corrected throttle opening As0 specified by the real accelerator opening Acc, the engine rotary speed Ne, the vehicle speed No and a gear ratio of the present gear stage of automatic transmission Ib is determined. With this arrangement, the corrected throttle opening As0 is substituted for the real accelerator opening Acc during high speed coasting, with the result that an output value Ip (function of corrected throttle opening) to the electromagnetic valve SD is set so as to increase PQ, and hence the quantity of lubricating oil. FIG. 7 shows an example of this map. FIG. 8 shows the map of the relationship between vehicle speed and the quantity of lubricating oil. It is noted that the example in FIGS. 7 and 8 illustrates the case where the engine rotary speed Ne is 1500 rpm or more. When the engine rotary speed Ne is less than 1500 rpm, if the real accelerator Acc is zero, then the corrected throttle opening As0 is set at zero, as well. Furthermore, the examples in FIGS. 7 and 8 exemplify the case of a fourth gear stage (0/D). In the case of a third gear stage, the quantity of lubricating oil can be reduced because the relative rotation speed of the gear is lower.

On the other hand, if a "yes" is detected in Step 210, namely, there is a determination that the transmission is shifting, then a timer T to be referenced in Step 228 is started in Step 218, and a solenoid valve output corresponding to shifting conditions is instituted in Step 220. Thereafter, the flag S is set to 1 in Step 222, and the gear ratio Ib is set to Ih in Step 224. Here, Ih is the gear ratio of the gear stage after shifting is completed.

In Step 226, a corrected throttle opening As1 is determined from the vehicle speed No, the real accelerator opening Acc. the engine rotary speed Ne and the type of shifting. The corrected throttle opening As1 is set so as to increase the quantity of lubricating oil at a faster rate than the corrected throttle opening As0 in the aforesaid non-shifting state, i.e., the throttle opening is greater for a given accelerator opening and vehicle speed.

After a predetermined period of time Tb1 has lapsed from the starting of the timer T in Step 218 (i.e., determination Step 228 results are "yes"), S is set at S=2 in Step 230. In this case, a corrected throttle opening As2 is determined in accordance with vehicle speed No, the real accelerator opening Acc, the engine rotary speed Ne and the gear ratio Ih of the gear stage in Step 232. This corrected throttle opening As2 is set so as to increase the quantity of lubricating oil above that set when the corrected throttle opening is based upon As1. Until the predetermined time Tb2 elapses, the load current Ip is based upon the corrected throttle opening As2. After a lapse of the predetermined period of time Tb2, S is set at S=0, and, in the subsequent flow, in Step 214, the corrected throttle opening As0 is searched. Additionally, the predetermined time Tb2 may be changed in accordance with engine load and type of shifting.

When it is determined that the transmission is shifting while S is still set at S=2, the routine proceeds to Steps 210, 218, 220 and 222, whereby timer outputs Tb2 and corrected throttle opening As2 from the preceding shifting process are cancelled, and the control for a the subsequent shifting commences. This measure is taken to account for the contingency where the increase in lubrication quantities from the previous shifting is continuing at the time a subsequent shifting is detected. As a result, the subsequent shift processing is performed with priority over the process occurring for a period of time after the previous shifting.

In the above embodiment, the lubricating oil quantity control takes into account the engine load, as well as the vehicle speed, so that the quantity of lubricating oil increase for higher torque values at a given vehicle speed. Further, the gear stages and the type of shifting are taken into consideration. Consequently, when operating at lower gear stages, the quantity of lubricating oil is increased. When in the third gear stage, a small quantity of lubricating oil is supplied because the gear rotations are low relative to the lower gear stages. When operating in the fourth gear stages (overdrive), the gear rotations are greater than at the third stage. Accordingly, the corrected throttle opening is adjusted to supply a larger quantity of lubricating oil.

Figure 9:
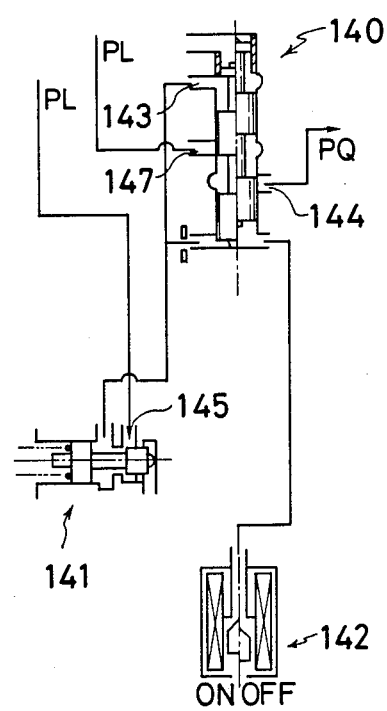
FIG. 9 is a hydraulic circuit diagram in the essential portions showing another means for changing the lubricating oil pressure.

The above embodiment, controls the quantity of lubricating oil in association with the vehicle speed by the combination of an electromagnetic proportion valve with a secondary regulator valve. However, the present disclosed invention is not so limited, and may encompass further control systems for controlling oil pressure in association with vehicle speed. For example, as shown in the further embodiment of FIG. 9, in place of the electromagnetic proportion valve, a relief valve 141, a duty control valve 140 and a high speed solenoid valve 142 are provided. The duty ratio of the high speed solenoid valve 142 may be controlled to desirably regulate the line pressure applied to a port 147 of the duty control valve 140 with the control oil pressure PQ at a port 144. In this embodiment, a port 147 is connected to oil line point 136 shown in FIG. 4, the port 144 is connected to port 119 of the primary regulator valve 103, and further, a port 145 of the relief valve 141 is connected to the oil line point 136. The regulation of pressure by such duty ratio controls are disclosed the disclosures of Japanese Utility Model Application Publication No. 38186/1983, Patent Kokai (Laid-Open) No. 24246/1981 and the like, which disclosures are well known, and expressly incorporated herein by reference.

In the above embodiments, not only the quantity of lubricating oil, but also the line pressure, are simultaneously increased or decreased with the increase or decrease of the vehicle speed. However, the present invention does not indispensably require such simultaneous speed related control of the line pressure. There may be instances where such speed related control of the line pressure is not preferred. In such instances, the lubricating oil may be controlled separately. For example, the electromagnetic proportion valve SD shown in FIG. 4 may be made to control only the secondary regulator valve, and an electromagnetic proportion valve similar thereto may be provided for independently controlling the primary regulator valve.

What is claimed is:

1. A device for controlling a quantity of lubricating oil in an automatic transmission for a vehicle having an engine, wherein a pump is rotated to circulate the lubricating oil, comprising:
   means for detecting a vehicle speed; and
   means for setting a circulation quantity of lubricating oil such that said circulation quantity increases as a function of detected increases in vehicle speed, even when the load of said engine is zero.

2. The device for controlling the quantity of lubricating oil as set forth in claim 1, further comprising:
   means for detecting at least one of an engine load, an occurrence of shifting, a type of shifting, a pattern of shifting and a gear stage;
   wherein, said means for setting a circulation quantity of lubricating oil further sets said circulation quantity in accordance with at least one of said engine load, said occurrence of shifting, said type of shifting, said pattern of shifting and said gear stage.

3. The device for controlling the quantity of lubricating oil as set forth in claim 2, wherein said means for setting said circulation quantity of lubricating oil includes an electromagnetic proportion valve.

4. The device for controlling the quantity of lubricating oil as set forth in claim 2, wherein said means for setting said circulation quantity of lubricating oil includes a duty ratio control valve.

5. The device for controlling the quantity of lubricating oil as set forth in claim 1, further comprising:
   means for detecting an occurrence of shifting;
   means for detecting a type of shifting;
   means for detecting an engine load; and
   means for ascertaining a predetermined period of time after shifting has occurred;
   wherein said means for setting a circulation quantity of lubricating oil further sets said circulation quantity in accordance with said type of shifting and said engine load, for said predetermined period of time after shifting has occurred.

6. The device for controlling the quantity of lubricating oil as set forth in claim 5, wherein said means for setting said circulation quantity of lubricating oil includes an electromagnetic proportion valve.

7. The device for controlling the quantity of lubricating oil as set forth in claim 5, wherein said means for setting said circulation quantity of lubricating oil includes a duty ratio control valve.

8. The device for controlling the quantity of lubricating oil as set forth in claim 5, wherein said predetermined period of time is changed in accordance with said type of shifting and said engine load.

9. The device for controlling the quantity of lubricating oil as set forth in claim 8, wherein said means for setting said circulation quantity of lubricating oil includes an electromagnetic proportion valve.

10. The device for controlling the quantity of lubricating oil as set forth in claim 8, wherein said means for setting said circulation quantity of lubricating oil includes a duty ratio control valve.

11. The device for controlling the quantity of lubricating oil as set forth in claim 1, wherein said means for setting said circulation quantity of lubricating oil includes an electromagnetic proportion valve.

12. The device for controlling the quantity of lubricating oil as set forth in claim 1, wherein said means for setting said circulation quantity of lubricating oil includes a duty ratio control valve.

* * * * *